Dec. 3, 1957  G. C. PEARCE  2,815,428
DOMESTIC APPLIANCES
Filed Nov. 1, 1954
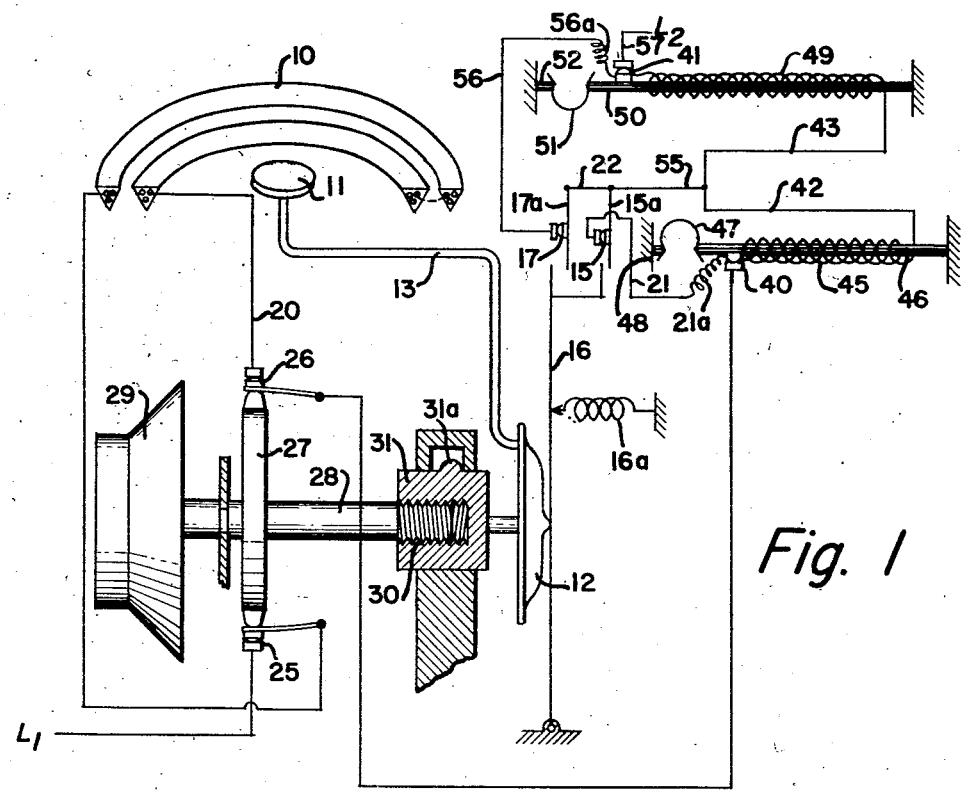
INVENTOR.
George C. Pearce
BY
R. R. Candor
His Attorney

United States Patent Office 2,815,428
Patented Dec. 3, 1957

2,815,428

DOMESTIC APPLIANCES

George C. Pearce, Dayton, Ohio, assignor to General Motors Corporation, Detroit, Mich., a corporation of Delaware Application November 1, 1954, Serial No. 466,073

21 Claims. (Cl. 219—20)

This invention relates to domestic appliances and more particularly to a controller for an electric range top heater or the like.

An object of this invention is to provide an improved control for an electric range top heater or the like which has high wattage warming input and has a two-stage reduced input as the desired final temperature is approximated, in a manner to prevent substantial overshooting of such final temperature.

Another object of this invention is to provide an improved control for an electric range top heater or the like which has high wattage warming input to a first critical temperature near and below the desired final temperature, followed by a first reduced input from and above said first critical temperature to a second and higher critical temperature nearer and below said final temperature followed by a second reduced input adapted substantially to maintain said final temperature.

Another object of this invention is to provide a control for a single wire heater which provides a three-stage input to provide high initial heating capacity until the final desired temperature is approximated, followed by two intermittent input stages below said final temperature to maintain said final temperature while preventing substantial overshooting.

Another object of this invention is to provide a controller according to the foregoing objects which is adjustable by a single knob from an off position to a plurality of selectable desired final temperatures.

Further objects and advantages of the present invention will be apparent from the following description, reference being had to the accompanying drawings wherein a preferred form of the invention is clearly shown.

In the drawings:

Figure 1 is a diagrammatic representation of the electric range top heater and the improved controller therefor.

Figure 2 is a simplified wiring diagram of the controller shown in Figure 1.

Figure 3 is a wiring diagram, similar to Figure 2, and showing a modified form of thermostatic pulsating switch.

An electrical resistance range top heater 10 or the like is adapted to heat a cooking utensil, not shown, and is adapted to be connected to a source of electrical current through the medium of lines $L_1$ and $L_2$ which may be connected to such source by the usual connector, not shown. Preferably the heater 10 is a single or parallel wire heater always operating at full wattage when energized at its rated voltage.

A thermostatic fluid bulb 11 is adapted to be responsive to the temperature of the cooking utensil resting on the heater 10, and the bulb may be located centrally of the heater 10 and be urged upwardly against the bottom wall of the cooking utensil by any spring construction, now well known. A thermostatic fluid actuator 12, in the form of a bellows or diaphragm, is connected to the bulb 11 through the medium of a flexible tube 13.

The bulb 11 itself may have an actual temperature slightly different than the temperature of the contents of the cooking utensil. However, the differential is more or less constant and any variation in such differential is substantially negligible. The knob of the controller may be marked in terms of temperature of the utensil contents, and the calibration of the controller automatically includes such differential.

A first thermostat switch 15 is controlled by the actuator 12 through the medium of arm 16 leftwardly urged by spring 16a. Switch 15 remains closed by the leftward spring tension of blade 15a when the bulb 11 is below a first critical temperature (of the utensil contents or bulb 11) which is near and below the desired or selected final temperature (of the utensil contents or bulb 11) to which the controller is adjusted. For example, when the controller is adjusted to maintain a boiling temperature of water in the utensil, assumed to be 212° F., then the switch 15 is adapted to remain closed from the starting temperature of the bulb 11 until the bulb reaches its first critical temperature corresponding to a utensil content first critical temperature of 190° F., at which temperature the switch 15 is opened by the actuator 12 and remains open at and above such first critical temperature.

A second thermostat switch 17 is controlled by the actuator 12 through the medium of arm 16 and remains closed under the leftward spring tension of blade 17a from the starting temperature until the bulb 11 reaches its second and higher critical temperature corresponding to a utensil content second critical temperature of 210° F. Switch 17 is opened by the actuator 12 when said bulb is at and above said second and higher critical temperature and remains open at all temperatures above such second and higher critical temperature.

The first thermostat switch 15 is in series with the heater 10 through the medium of lines 20 and 21. The second thermostat switch 17 is in series with the heater 10 and with the first thermostat switch through the medium of lines 20, 21 and 22. When both switches 15 and 17 are closed, current can flow constantly at full wattage through the heater 10 from the line $L_1$ to the line $L_2$ provided that the line switches 25 and 26 are also closed. The action of arm 16 and switches 15 and 17 is diagrammatically illustrated in Figures 1, 2 and 3. It is understood that suitable snap action is to be built into the thermostatic construction to provide snap make and break contact at 15 and 16.

The line switches 25 and 26 are actuated by a cam 27 which is rotated by the shaft 28 which in turn is rotated by the knob 29 which the user may adjust from the off position to a plurality of desired final utensil content temperatures. If desired, the switches 25 and 26 may be provided with suitable snap action, not shown, for quick make and break action. Knob 29 may be marked in degrees, or in well known cooking terms such as "simmer," "boil," "fry," etc. When the knob 29 is in the off position, the switches 25 and 26 are open, and thus disconnect the heater 10 from the source of electric current; but when the knob 29 is turned to any desired final temperature setting, then the switches 25 and 26 are closed.

The knob 29 adjusts the actuator 12 to the desired one of a plurality of final temperatures through the medium of the thread 30 at the end of shaft 28, which is threaded into the rotationally fixed but axially movable nut 31, which carries the actuator or diaphragm 12. Turning of the knob 29 turns the thread 30, which in turn axially moves the nut 31 and the actuator 12. The key 31a prevents nut 31 from rotating but allows it to move axially.

A first cycling switch 40 is closed below the said first critical temperature when switch 15 is closed, and cycles between open and closed positions above said first critical temperature when switch 15 is open.

A second cycling switch 41 is closed below a second and higher critical temperature when switch 17 is closed, and cycles between open and closed positions above said second and higher critical temperature when switch 17 is open. Switch 41 is in series with switch 40 through the medium of wires 42 and 43.

The first cycling switch 40 may be in the form of any well known thermostatic pulsating and snap acting switch such as the bimetal type shown in Figures 1 and 2 or the hot tension wire, snap acting type switch shown in Figure 3. Likewise, the second cycling switch 41 may be of types similar to those described with respect to the first cycling switch 40.

Referring to Figures 1 and 2, the first thermostatic pulsating snap acting switch 40 is in parallel with the first thermostat switch 15, so that the current from the heater 10 is shunted through lines 21 and 22 (including flexible wire 21a) when the switch 15 is closed, but flows through the low resistance heater wire 45, if the switch 15 is open. When the switch 15 is opened, the heater wire 45 heats the bimetal blade 46 and causes it to snap from closed to open position, for example, by the action of the C-spring 47 placed between the end of blade 46 and the fixed blade or abutment 48. When the pulsating switch 40 is pulsating, the heater 10 is energized at full wattage only 25% of the time, and this is substantially accomplished by calibrating the switch 40 to open in ten seconds after the wire 45 is energized and to reclose in thirty seconds, as the wire 45 cools.

As the temperature of the bulb 11 continues to rise after it has opened switch 15, it opens switch 17, which is in parallel with the second thermostatic pulsating switch 41. When switches 15 and 17 are opened, the current flows from the heater 10 through switch 40, wires 45, 42, 43 through another low resistance heater 49, switch 41 and wire 57 to line L₂. This causes the switch 41 to pulsate between closed and open positions because the wire 49 heats the bimetal blade 50 which is caused to snap by the C-spring 51 placed between the end of blade 50 and the end of blade on fixed abutment 52. The switch 41 may be constructed to be on, or in closed position, only 5% of the time when it is pulsating. This may be substantially accomplished by calibrating it to open in two seconds after the wire 49 is energized and to reclose in forty seconds, as the wire is deenergized and cools, in a well known manner.

In the operation of the controller as shown in Figures 1 and 2, the knob 29 is adjusted from the off position to any selected desired final temperature of the cooking utensil contents such as 212°, or "boil." This closes the switches 25 and 26, and the switches 15 and 17 remain closed as long as the temperature of the contents of the utensil resting on heater 10 remains below the first critical temperature. Current then passes from L₁ through switch 25, heater 10, switch 26, closed switch 40, wires 21a and 21, switch 15, wire 22, switch 17, wires 56 and 56a, closed switch 41, wire 57 and L₂. The heater is energized at full wattage and quickly heats the utensil contents.

As the contents of the utensil reach the first critical temperature, such as 190°, the bulb 11 reaches its corresponding first critical temperature, and opens the switch 15. Current then passes from L₁ through switch 25, heater 10, switch 26 and first cycling switch 40 which then sends the current intermittently through the wire 45, wires 42, 55, closed switch 17, wire 56, flexible wire 56a, closed switch 41, wire 57 to L₂. The heater is energized at full wattage intermittently at only 25% on time, which is the equivalent of 25% capacity of the heater.

As the temperature of the cooking utensil contents rises above the first critical temperature under the reduced input provided by the cycling switch 40, the utensil contents and the bulb 11 reach their respective second and higher critical temperatures, whereupon the switch 17 is opened. This causes the current to pass intermittently from L₁, switch 25, heater 10, wire 20, switches 26 and 40, wires 45, 42, 43 and 49, pulsating switch 41, wire 57 and L₂. Since the switch 41 is adapted to open in two seconds, as compared to the ten second opening requirement of switch 40, the switch 41 can cycle without causing the switch 40 to cycle and controls the energy output of the heater in accordance with the cycling of switch 41. Under these conditions, the heater 10 is energized intermittently at only 5% on time, or the equivalent of 5% of maximum capacity of the heater, and this is sufficient to maintain the cooking utensil contents substantially at the desired final temperature without causing them to rise appreciably above such final temperature or to boil violently, as the case may be.

In the modification shown in Figure 3, corresponding elements, wires and switches are indicated with the same numerals as in Figures 1 and 2. The knob 29, shaft 28, actuator 12, etc, of Figures 1 and 2 are to be supplied in the system of Figure 3. The pulsating switches 40 and 41 of Figures 1 and 2 are indicated as 40a and 41a respectively in Figure 3. These switches 40a and 41a of the hot tension wire, snap acting type, more fully disclosed in U. S. Patent to C. J. Werner, 2,095,579, patented October 12, 1937, with the exception that the switches illustrated herein are of the single circuit type instead of the double circuit type disclosed in the patent. The current coming from switch 26 as previously described with respect to Figures 1 and 2 can pass through switch 40a from the stationary contact 60 through the blade 61 to the rocking plate 62 which rocks about the fulcrum 63 under the action of the tension spring 64 and of the hot tension wire 65. The blade 61 snaps from the contact 60 to the fixed abutment 66 as the notch 67 rocks past the snapping position, due to the tension of spring 68 and the elongation of the low resistance "hot wire" 65 which heats sufficiently to allow the plate 62 to rock and cause the blade 61 to snap open. A flexible wire 69 connects the plate 62 with the wire 21. Similarly the switch 41a is provided with the low resistance "hot wire" 70 and has the similar snap acting mechanisms which have been previously identified and briefly described with respect to switch 40a. No wire corresponding to flexible wire 69 is required for switch 41a. The blade 72 is caused to snap between closed and open positions similarly as described with respect to switch 40a. The switches 40a and 41a have the same on time as switches 40 and 41.

In the operation of the controller shown in Figure 3, the switches 15 and 17 remain closed as long as the temperatures of the contents of the cooking utensil and of bulb 11 remains below their respective first critical temperatures and hence the heater 10 can be continuously energized at full wattage. The current passes continuously from line L₁ to L₂ at full wattage through switch 25, heater 10, wire 20, switch 26, closed switch 40a, plate 62, flexible wire 69, wire 21, switch 15, wire 22, switch 17, wire 56, wire 57 and line L₂. When switch 15 opens at the first critical temperature, the current passes intermittently at 25% on time at full wattage from switch 26 through blade 61, plate 62, hot wire 65, wires 42 and 55, closed switch 17, wires 56 and 57 to L₂. When the second critical temperature is reached, and the switch 17 is opened, then the current passes intermittently at 5% on time at full wattage from L₁ through heater 10, closed switch 40a, wire 65 (which cannot now be energized long enough to cycle switch 40a), wires 42 and 43 to hot wire 70 and from thence through the pulsating switch blade 72 to wire 57 and line L₂. The duration of time, temperature controls, and other factors are substantially the same as previously described with respect to the switches 40 and 41 in Figures 1 and 2.

While the form of embodiment of the invention as herein disclosed constitutes a preferred form, it is to be understood that other forms might be adopted as may come within the scope of the claims which follow.

What is claimed is as follows:

1. In combination: an electrical resistance heater adapted to heat a cooking utensil or the like and adapted to be connected to a source of electric current; a thermostatic controller adapted to be responsive to the temperature of said utensil; a first cycling switch controlled by said thermostatic controller and controlling the energization of said heater and continuously closed below a first critical temperature of said thermostatic controller and cycling between open and closed positions after said first critical temperature is reached; a second cycling switch controlled by said thermostatic controller in series with said first cycling switch and controlling the energization of said heater and continuously closed below a second and higher critical temperature of said thermostatic controller and cycling between open and closed positions after said second and higher critical temperature is reached; means to adjust the setting of said critical temperatures; and manually operable means to disconnect said heater from said source of electric current.

2. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first thermostatic pulsating switch in parallel with said first thremostat switch and pulsating when said first thermostat switch is open; and a second thermostatic pulsating switch in parallel with said second thermostat switch and pulsating when said second thermostat switch is open.

3. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first thermostatic pulsating switch in parallel with said first thermostat switch shunted when said first thermostat switch is closed and pulsating when said first thermostat switch is open; and a second thermostatic pulsating switch in parallel with said second thermostat switch shunted when said second thermostat switch is closed and pulsating when said second thermostat switch is open.

4. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first thermostatic pulsating switch in parallel with said first thermostat switch shunted when said first thermostat switch is closed and pulsating with a less on time than off time when said first thermostat switch is open; and a second thermostatic pulsating switch in parallel with said second thermostat switch shunted when said second thermostat switch is closed and pulsating with a less on time than off time and with less on time than that of said first thermostatic pulsating switch when said second thermostat switch is open.

5. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first hot tension wire pulsating switch in parallel with said first thermostat switch and pulsating when said first thermostat switch is open; and a second hot tension wire pulsating switch in parallel with said second thermostat switch and pulsating when said second thermostat switch is open.

6. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first hot tension wire pulsating switch in parallel with said first thermostat switch shunted when said first thermostat switch is closed and pulsating when said first thermostat switch is open; and a second hot tension wire pulsating switch in parallel with said second thermostat switch shunted when said second thermostat switch is closed and pulsating when said second thermostat switch is open.

7. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first hot tension wire pulsating switch in parallel with said first thermostat switch shunted when said first thermostat switch is closed and pulsating with a less on time than off time when said first thermostat switch is open; and a second hot tension wire pulsating switch in parallel with said second thermostat switch shunted when said second thermostat switch is closed and pulsating with a less on time than off time and with less on time than that of said first thermostatic pulsating switch when said second thermostat switch is open.

8. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first thermostatic pulsating switch in parallel with said first thermostat switch and pulsating when said first thermostat switch is open; a second thermostatic pulsating switch in parallel with said second thermostat switch and pulsating when said second thermostat switch is open; and means to adjust the setting of said critical temperatures.

9. In combination: an electrical resistance heater adapted to heat a cooking utensil or the like and adapted to be connected to a source of electric current; a thermostatic fluid bulb adapted to be responsive to the temperature of said utensil; a thermostatic fluid actuator connected to said bulb; a first thermostat switch controlled by said actuator and in series with said heater and closed when said bulb is below a first critical temperature and opened by said actuator when said bulb is at and above said first critical temperature; a second thermostat switch controlled by said actuator and in series with said heater and with said first thermostat switch and closed when said bulb is below a second and higher critical temperature and opened by said actuator when said bulb is at and above said second and higher critical temperature; a first thermostatic pulsating switch in parallel with said first thermostat switch and pulsating when said first thermostat switch is open; a second thermostatic pulsating switch in parallel with said second thermostat switch and pulsating when said second thermostat switch is open; means to adjust the setting of said critical temperatures; and means to disconnect said heater from said source of electric current.

10. In combination: an electrical resistance heater adapted to heat a cooking utensil or the like and adapted to be connected to a source of electric current; a thermostatic controller adapted to be responsive to the temperature of said utensil; a first cycling switch controlled by said controller and controlling the energization of said heater and continuously closed below a first critical temperature of said controller and cycling between open and closed positions after said first critical temperature is reached; and a second cycling switch controlled by said controller and in series with said first cycling switch and controlling the energization of said heater and continuously closed below a second and higher critical temperature of said controller and cycling between open and closed positions after said second and higher critical temperature is reached.

11. In combination: an electrical resistance heater adapted to heat a cooking utensil or the like and adapted to be connected to a source of electric current; a thermostatic controller adapted to be responsive to the temperature of said utensil; a first cycling switch controlled by said controller and controlling the energization of said heater and continuously closed below a first critical temperature of said controller and cycling between open and closed positions above said first critical temperature with closed cycling position time shorter than the open cycling position time; and a second cycling switch controlled by said controller and in series with said first cycling switch and controlling the energization of said heater and continuously closed below a second and higher critical temperature of said controller and cycling between open and closed positions above said second and higher critical temperature.

12. In combination: an electrical resistance heater adapted to heat a cooking utensil or the like and adapted to be connected to a source of electric current; a thermostatic controller adapted to be responsive to the temperature of said utensil; a first cycling switch controlled by said controller and controlling the energization of said heater and continuously closed below a first critical temperature of said controller and cycling between open and closed positions above said first critical temperature; and a second cycling switch controlled by said controller and in series with said first cycling switch and controlling the energization of said heater and continuously closed below a second and higher critical temperature of said controller and cycling between open and closed positions above said second and higher critical temperature with closed cycling position time shorter than the open cycling position time and shorter than the closed position time of said first cycling switch.

13. In combination: an electrical resistance heater adapted to heat a cooking utensil or the like and adapted to be connected to a source of electric current; a thermostatic controller adapted to be responsive to the temperature of said utensil; a first cycling switch controlled by said controller and controlling the energization of said heater and continuously closed below a first critical temperature of said controller and cycling between open and closed positions above said first critical temperature with closed cycling position time shorter than the open cycling position time; and a second cycling switch controlled by said controller and in series with said first cycling switch and controlling the energization of said heater and continuously closed below a second and higher critical temperature of said controller and cycling between open and closed positions above said second and higher critical temperature with closed cycling position time shorter than the open cycling position time and shorter than the closed position time of said first cycling switch.

14. In combination: an electrical resistance heater adapted to heat a cooking utensil or the like and adapted to be connected to a source of electric current; a thermostatic controller adapted to be responsive to the temperature of said utensil; a first cycling switch controlled by said controller and controlling the energization of said heater and continuously closed below a first critical temperature of said controller and cycling between open and closed positions after said first critical temperature is reached; a second cycling switch controlled by said controller and in series with said first cycling switch and controlling the energization of said heater and continuously closed below a second and higher critical temperature of said controller and cycling between open and closed positions after said second and higher critical temperature is reached; and means to adjust the setting of said critical temperatures.

15. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first thermostatic pulsating switch in parallel with said first thermostat switch and pulsating when said first thermostat switch is open; and a second thermostatic pulsating switch in parallel with said second thermostat switch and pulsating when said second thermostat switch is open.

16. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first thermostatic pulsating switch in parallel with said first thermostat switch shunted when said first thermostat switch is closed and pulsating when said first thermostat switch is open; and a second thermostatic pulsating switch in parallel with said second thermostat switch shunted when said second thermostat switch is closed and pulsating when said second thermostat switch is open.

17. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first thermostatic pulsating switch in parallel with said first thermostat switch shunted when said first thermostat switch is closed and pulsating with a less on time than off time when said first thermostat switch is open; and a second thermostatic pulsating switch in parallel with said second thermostat switch shunted when said second thermostat switch is closed and pulsating with a less on time than off time and with less on time than that of said first thermostatic pulsating switch when said second thermostat switch is open.

18. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first hot tension wire pulsating switch in parallel with said first thermostat switch and pulsating when said first thermostat switch is open; and a second hot tension wire pulsating switch in parallel with said second thermostat switch and pulsating when said second thermostat switch is open.

19. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first hot tension wire pulsating switch in parallel with said first thermostat switch shunted when said first thermostat switch is closed and pulsating when said first thermostat switch is open; and a second hot tension wire pulsating switch in parallel with said second thermostat switch shunted when said second thermostat switch is closed and pulsating when said second thermostat switch is open.

20. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first hot tension wire pulsating switch in parallel with said first thermostat switch shunted when said first thermostat switch is closed and pulsating with a less on time than off time when said first thermostat switch is open; and a second hot tension wire pulsating switch in parallel with said second thermostat switch shunted when said second thermostat switch is closed and pulsating with a less on time than off time and with less on time than that of said first thermostatic pulsating switch when said second thermostat switch is open.

21. In combination: an electrical resistance heater adapted to heat a cooking utensil or the like and adapted to be connected to a source of electric current; a first thermostat switch thermostatically controlled in response to the temperature of said utensil and in series with said heater and closed when said utensil is below a first critical temperature and opened when said utensil is at or above said first critical temperature; a second thermostat switch thermostatically controlled in response to the temperature of said utensil and in series with said heater and with said first thermostat switch and closed when said utensil is below a second and higher critical temperature and opened when said utensil is at or above a second and higher critical temperature; a first thermostatic pulsating switch in parallel with said first thermostat switch and pulsating when said first thermostat switch is open; a second thermostatic pulsating switch in parallel with said second thermostat switch and pulsating when said second thermostat switch is open; and means to adjust the setting of said critical temperatures.

References Cited in the file of this patent

UNITED STATES PATENTS

| | | |
|---|---|---|
| 2,137,073 | Bletz | Nov. 15, 1938 |
| 2,302,603 | Davis et al. | Nov. 17, 1942 |
| 2,409,414 | Bletz | Oct. 15, 1946 |
| 2,434,467 | McCormick | Jan. 13, 1948 |
| 2,510,038 | Rudahl | May 30, 1950 |
| 2,767,293 | Jordan et al. | Oct. 16, 1956 |